(12) United States Patent
Tatarchenkov et al.

(10) Patent No.: US 11,545,898 B1
(45) Date of Patent: Jan. 3, 2023

(54) PEDESTAL LOOP IN DC/DC POWER CONVERTER

(71) Applicant: Dialog Semiconductor (UK) Limited, London (GB)

(72) Inventors: Gennadii Tatarchenkov, Munich (DE); Alberto Sozzani, Munich (DE); Alessandro Angeli, Munich (DE)

(73) Assignee: Dialog Semiconductor (UK) Limited, London (GB)

(*) Notice: Subject to any disclaimer, the term of this patent is extended or adjusted under 35 U.S.C. 154(b) by 33 days.

(21) Appl. No.: 16/984,602

(22) Filed: Aug. 4, 2020

(51) Int. Cl.
  *H02M 3/157* (2006.01)
  *H02M 3/158* (2006.01)
  *H02M 1/08* (2006.01)
  *H02M 1/00* (2006.01)

(52) U.S. Cl.
  CPC ............ *H02M 3/157* (2013.01); *H02M 1/08* (2013.01); *H02M 3/1584* (2013.01); *H02M 1/0006* (2021.05); *H02M 1/0022* (2021.05)

(58) Field of Classification Search
  None
  See application file for complete search history.

(56) References Cited

U.S. PATENT DOCUMENTS

| | | | | |
|---|---|---|---|---|
| 7,292,014 B2* | 11/2007 | Lee | ......................... | H03F 3/217 323/266 |
| 7,932,709 B1* | 4/2011 | Ling | ..................... | H02M 3/156 323/285 |
| 8,575,911 B2* | 11/2013 | Cheng | ................. | H02M 3/1588 323/283 |
| 2003/0231012 A1* | 12/2003 | Corva | ................... | H02M 3/156 323/285 |
| 2007/0057721 A1* | 3/2007 | Risbo | ....................... | H03F 1/32 330/10 |
| 2020/0127569 A1* | 4/2020 | Priego | ................... | H02M 3/158 |

OTHER PUBLICATIONS

Switch-Mode Power Supplies, Spice Simulations and Practical Designs, by Christophe P. Basso, Electronic Engineering, Copyright 2008 by The McGraw-Hill Companies, 0-07-158935-X.

* cited by examiner

*Primary Examiner* — Jeffrey A Gblende
(74) *Attorney, Agent, or Firm* — Saile Ackerman LLC; Stephen B. Ackerman

(57) ABSTRACT

The present document relates to a power converter configured to generate an output voltage at an output of the power converter. The power converter may comprise a power stage, a modulator circuit, ramp generator circuit, a first feedback circuit, and a second feedback circuit. The power stage may be coupled to the output of the power converter. The modulator circuit may comprise a first input and a second input, and an output of the modulator circuit may be coupled to the power stage. The ramp generator circuit may be configured to generate a ramp signal, and an output of the ramp generator circuit may be coupled to the first input of the modulator circuit. The first feedback loop may be coupled between the output of the power converter and the second input of the modulator circuit.

20 Claims, 13 Drawing Sheets

PEDESTAL LOOP IN DC/DC POWER CONVERTER

TECHNICAL FIELD

The present document relates to DC (Direct Current)/DC power converters. In particular, the present document relates to new negative feedback schemes in DC/DC power converters which enable an increased control loop design flexibility.

BACKGROUND

There are two main approaches for designing feedback loops in DC/DC power converters: voltage mode control (main voltage loop) or current mode control (main voltage loop with internal current loop). Depending on the application and requirements, one of them can be chosen. However, in many scenarios, the current mode control is more advantageous compared to the voltage mode control. The benefit of the current loop is that it splits the complex poles associated with the output LC filter, simplifies the voltage loop design, and achieves a higher gain bandwidth product and better transient response compared to the voltage mode control approach.

However, the current loop design inherently has several disadvantages. Firstly, since the current loop uses an output current as feedback in front of the modulator, in a first approximation it has zero information about the output voltage and does not help to react in response to disturbances of the output voltage. Indeed, it only performs the pole splitting. Secondly, the implementation of the current loop may be complicated. This holds in particular for the generation of accurate replica currents. Thirdly, the current mode control DC/DC power converter may be susceptible to current mode instabilities. And fourthly, due to the sampling gain in the current loop, the unity gain bandwidth needs to be significantly smaller than the switching frequency of the power converter.

SUMMARY

The present document addresses the above-mentioned technical problems. In particular, the present document addresses the technical problem of providing a DC/DC power converter with improved performance in terms of in terms of load (output) transient response, in terms of line (input) transient response and power supply rejection ratio. In particular, it is an object of the present document to increase the gain bandwidth of a voltage control loop and, in general, to increase the control loop design flexibility.

According to an aspect, a power converter is presented. The power converter is configured to generate an output voltage at an output of the power converter. The power converter may comprise a power stage, a modulator circuit, ramp generator circuit, a first feedback circuit (main voltage loop), and a second feedback circuit. The power stage may be coupled to the output of the power converter. The modulator circuit may comprise a first input and a second input, and an output of the modulator circuit may be coupled to the power stage. The ramp generator circuit may be configured to generate a ramp signal, and an output of the ramp generator circuit may be coupled to the first input of the modulator circuit. The first feedback loop may be coupled between the output of the power converter and the second input of the modulator circuit. The second feedback loop may be (a) coupled between the output of the power converter and the first input of the modulator circuit or may be (b) coupled between the output of the power converter and the second input of the modulator circuit.

Within this document, the second feedback loop may also be denoted as Pedestal loop. The second feedback loop may comprise a high pass filter, thus, it enables an additional AC-(alternating current) feedback or high frequency feedback, which provides certain advantages compared to conventional current loops. The Pedestal loop performs a pole splitting with more degrees of freedom compared to the current loop, but with less complexity. Since the Pedestal loop senses the output voltage, in case of any transient event, it can quickly propagate this information from the output of the power converter to the inputs of the modulator circuit and correct the output voltage.

The modulator circuit may be e.g. a pulse width modulation (PWM) modulator. The modulator circuit may comprise e.g. a comparator circuit configured to compare the signals at the first and second input of the modulator circuit, and to output a binary signal indicating which of the input signals has a higher signal value.

The second feedback loop may be coupled between the output of the power converter and the output of the ramp generator circuit. For example, the second feedback loop may be coupled between the output of the power converter and the first input of the modulator circuit.

The ramp generator circuit may comprise an initial ramp generator, an offset generator, and a signal adder. The initial ramp generator may be configured to generate an initial ramp signal at an output of the initial ramp generator. The offset generator may be configured to generate an offset signal at an output of the offset generator. The signal adder may be configured to generate the ramp signal at the output of the ramp generator circuit by adding the initial ramp signal and the offset signal. At this, the initial ramp generator may periodically output the initial ramp signal e.g. a voltage signal that repeatedly rises in accordance with a positive ramp slope until a given upper ramp level is reached and subsequently falls in accordance with a negative ramp slope until a given lower ramp level is reached. Any of the positive ramp slope, the negative ramp slope, the upper ramp level and the lower ramp level may be variable. The offset generator may be configured to generate the offset signal e.g. as a voltage signal which may be smaller than, equal to, or larger than 0V. For this purpose, the offset generator may comprise e.g. a current source and one or more resistors. By adding the offset signal to the initial ramp signal, the average signal level of the initial ramp signal may be shifted up or down in order to adjust the properties of the first feedback loop. The resulting ramp signal may then be provided to the first input of the modulator circuit.

The second feedback loop may be coupled between the output of the power converter and the output of the initial ramp generator. Alternatively, the second feedback loop may be coupled between the output of the power converter and the output of the offset generator.

The high pass filter may be a passive high pass filter or an active high pass filter with a positive gain in a passband. The high pass filter may comprise a capacitive element which is (a) coupled between the output of the power converter and the first input of the modulator circuit, or which is (b) coupled between the output of the power converter and the second input of the modulator circuit via an inverting buffer. More specifically, the high pass filter may comprise a capacitive element which is (a) coupled between the output of the power converter and the first input of the modulator circuit if the second feedback loop is coupled between the output of the power converter and the first input of the modulator circuit, or which is (b) coupled between the output of the power converter and the second input of the modulator circuit via an inverting buffer if the second feedback loop is coupled between the output of the power converter and the second input of the modulator circuit. The capacitive element may be e.g. a capacitor or another device capable of storing electrical energy in an electric field.

The high pass filter may comprise a resistive element coupled between the capacitive element and a reference potential. The resistive element may be e.g. a resistor or a drain-source channel of a transistor, wherein said transistor may be appropriately coupled between the capacitive element and the reference potential.

Throughout this document, the term "reference potential" is meant in its broadest possible sense. In particular, the reference potential is not limited to ground i.e. a reference potential with a direct physical connection to earth. Rather, the term "reference potential" may refer to any reference point to which and from which electrical currents may flow or from which voltages may be measured. Moreover, it should be mentioned that the reference potentials mentioned in this document may not necessarily refer to the same physical contact. Instead, the reference potentials mentioned in this document may be related to different physical contacts although reference is made to "the" reference potential for ease of presentation.

The first feedback loop may comprise an error amplifier configured to compare the output voltage at the output of the power converter with a reference voltage. The power converter may further comprise a resistive voltage divider coupled between the output of the power converter and an input of the error amplifier. The error amplifier may be e.g. an operational transconductance amplifier (OTA) configured to generate the error voltage based on the comparison of the output voltage with the reference voltage, and the error voltage may be applied to the second input of the modulator circuit. Therefore, the first feedback loop may be regarded as a main voltage loop.

The internal current loop is coupled between the power stage and the first input of the modulator circuit. This current loop may comprise a current sensing circuit configured to sense a current within the power stage. More specifically, the current sensing circuit may be configured to sense a current flowing through an optional inductor coupled to the power stage.

The power stage may sometimes also be denoted as half-bridge. The power stage may comprise a high-side switching element coupled to a switching node of the power stage. Further, the power stage may comprise a low-side switching element coupled between the switching node and a reference potential.

The high-side switching element and the low-side switching element (sometimes also denoted as pass devices) may be implemented with any suitable device, such as, for example, a metal-oxide-semiconductor field effect transistor MOSFET, an insulated-gate bipolar transistor IGBT, a MOS-gated thyristor, or any other suitable power device. Each switching element may have a gate to which a respective driving voltage or control signal may be applied to turn the switching element on (i.e. to close the switching element) or to turn the switching element off (i.e. to open the switching element).

The power converter may further comprise an inductor, and a first terminal of the inductor may be coupled to the switching node. Moreover, the power converter may further comprise an output capacitor coupled between the output of the power converter and a reference potential.

For example, the power converter may be a boost power converter, the high-side switching element may be coupled between the output of the power converter and the switching node, and an input of the power converter may be coupled to a second terminal of the inductor. In a boost power converter, the output voltage may be equal to or larger than the input voltage, whereas the output current may be equal to or smaller than the input current.

Alternatively, the power converter may be a buck power converter, the high-side switching element may be coupled between the input of the power converter and the switching node, and the output of the power converter may be coupled to the second terminal of the inductor. In a buck power converter, the output voltage may be equal to or smaller than the input voltage, whereas the output current may be equal to or larger than the input current.

Of course, the power converter may also be a buck-boost power converter which combines features of the above described boost power converter and buck power converter.

According to another aspect, a method of operating a power converter is described. The method may comprise steps which correspond to the features of the power converter described in the present document. In particular, the power converter may be configured to generate an output voltage at an output of the power converter. The power converter may comprise a power stage coupled to the output of the power converter. The power converter may comprise a modulator circuit with a first input and a second input, wherein an output of the modulator circuit may be coupled to the power stage. The power converter may comprise a ramp generator circuit for generating a ramp signal, wherein an output of the ramp generator circuit may be coupled to the first input of the modulator circuit. The method may comprise providing a first feedback loop between the output of the power converter and the second input of the modulator circuit. The method may comprise providing a second feedback loop either (a) between the output of the power converter and the second input of the modulator circuit or (b) between the output of the power converter and the second input of the modulator circuit. The second feedback loop may comprise a high pass filter. For instance, the method may comprise coupling the second feedback loop between the output of the power converter and the output of the ramp generator circuit.

The ramp generator circuit may comprise an initial ramp generator, an offset generator, and a signal adder. The method may comprise generating, by the initial ramp generator, an initial ramp signal at an output of the initial ramp generator. The method may comprise generating, by the offset generator, an offset signal at an output of the offset generator. The method may comprise generating, by the signal adder, the ramp signal at the output of the ramp generator circuit by adding the initial ramp signal and the offset signal. The method may comprise coupling the second feedback loop between the output of the power converter and the output of the initial ramp generator. Alternatively or additionally, the method may comprise coupling the second feedback loop between the output of the power converter and the output of the offset generator.

The high pass filter may be a passive high pass filter or an active high pass filter with a positive gain in a passband. The high pass filter may comprise a capacitive element. The method may comprise coupling the capacitive element between the output of the power converter and the ramp generator circuit. Alternatively or additionally, the method may comprise coupling the capacitive element between the output of the power converter and the second input of the modulator circuit via an inverting buffer.

Moreover, the high pass filter may comprise a resistive element. The method may comprise coupling the resistive element between the capacitive element and a reference potential. The high pass filter may comprise an active high pass filter with a positive gain in a passband.

The first feedback loop may comprise an error amplifier for comparing the output voltage at the output of the power converter with a reference voltage. Further, the method may comprise coupling a current loop between the power stage and the modulator circuit, wherein the current loop comprises a current sensing circuit for sensing a current within the power stage. The power stage may comprise a high-side switching element coupled to a switching node of the power stage, and a low-side switching element coupled between the switching node and a reference potential.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein like or identical reference numerals denote like or identical elements, and wherein.

DETAILED DESCRIPTION

Figure 1:
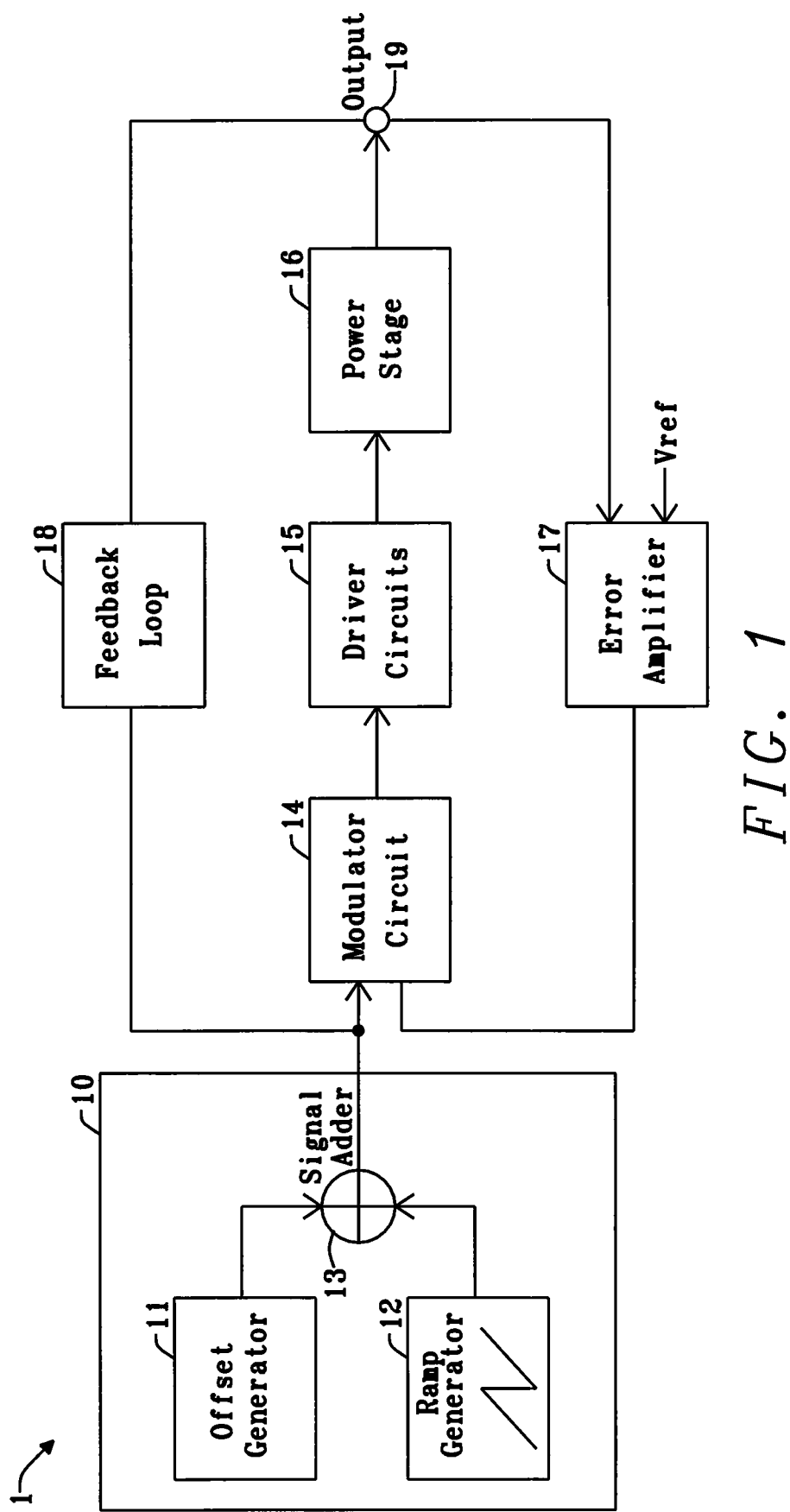
FIG. 1 shows a block diagram of a first exemplary power converter.

FIG. 1 shows a block diagram of a first exemplary power converter 1. Power converter 1 comprises a ramp generator circuit 10 with an initial ramp generator 12, an offset generator 11, and a signal adder 13. The ramp signal at the output of the ramp generator circuit 10 is provided to a first input of modulator circuit 14. Power converter 1 further comprises optional driver circuits 15 and a power stage 16. A first feedback loop comprises an error amplifier 17 which compares the output voltage at the output 19 of the power converter 1 with a reference voltage $V_{ref}$ and provides the result to the second input of modulator circuit 14. A second feedback loop comprises feedback loop 18 coupled between the output 19 of the power converter 1 and the first input of modulator circuit 14.

Figure 2:
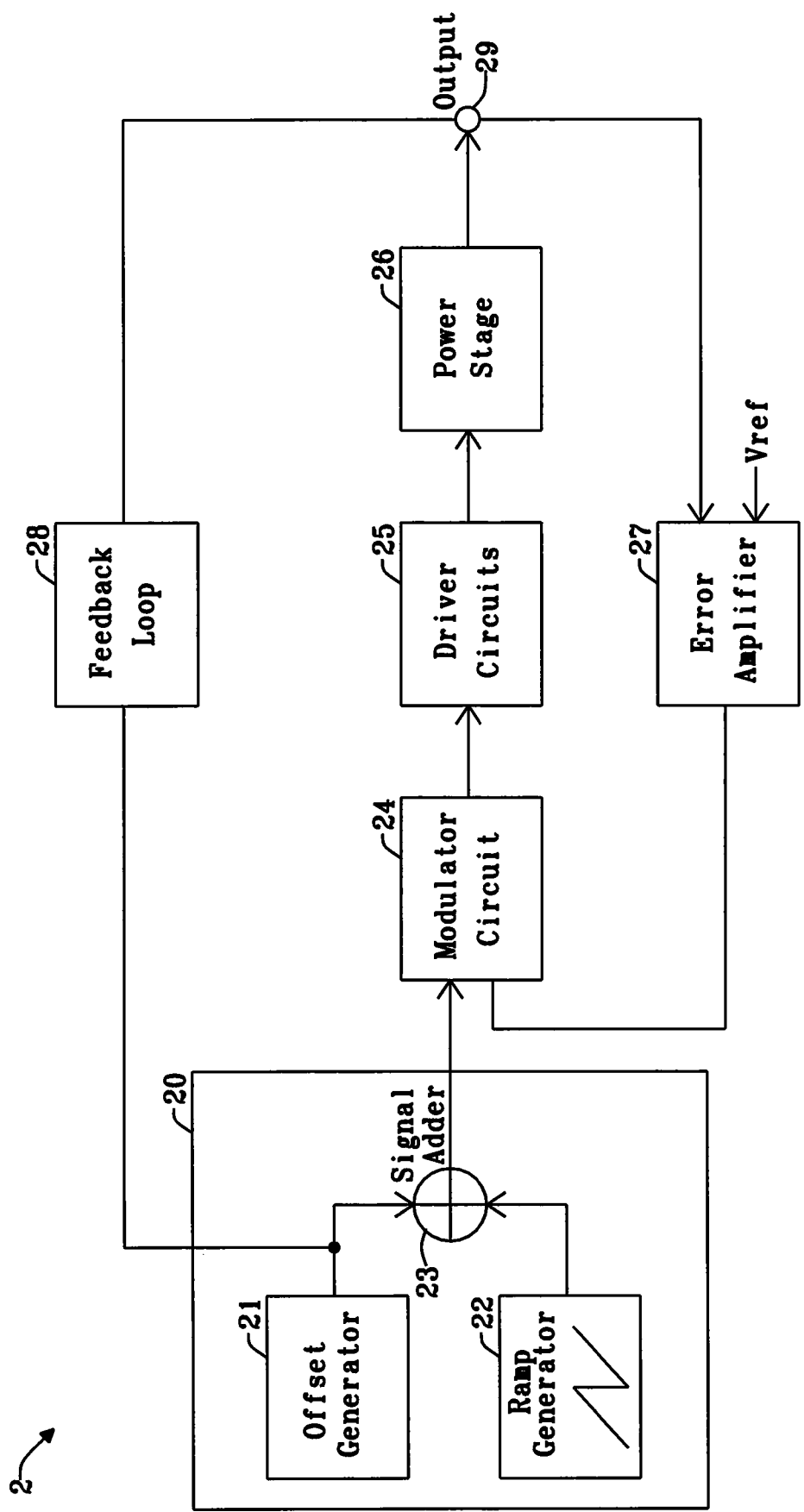
FIG. 2 shows a block diagram of a second exemplary power converter.

FIG. 2 shows a block diagram of a second exemplary power converter 2. Power converter 2 comprises a ramp generator circuit 20 with an initial ramp generator 22, an offset generator 21, and a signal adder 23. The ramp signal at the output of the ramp generator circuit 20 is provided to a first input of modulator circuit 24. Power converter 2 further comprises optional driver circuits 25 and a power stage 26. A first feedback loop comprises an error amplifier 27 which compares the output voltage at the output 29 of the power converter 2 with a reference voltage $V_{ref}$ and provides the result to the second input of modulator circuit 24. A second feedback loop 28 is coupled between the output 29 of the power converter 2 and the output of the offset generator 21.

Figure 3:
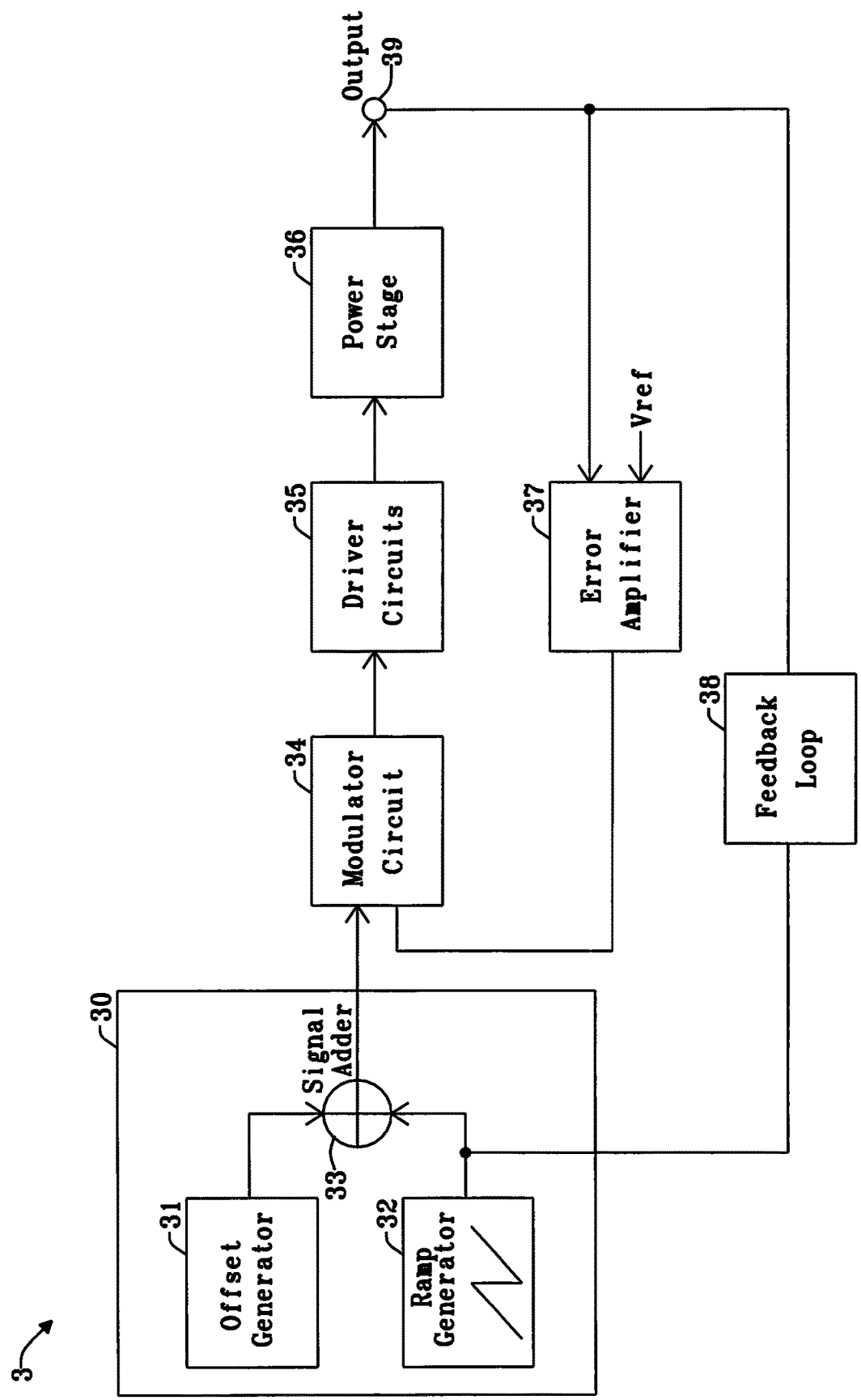
FIG. 3 shows a block diagram of a third exemplary power converter.

FIG. 3 shows a block diagram of a third exemplary power converter 3. Power converter 3 comprises a ramp generator circuit 30 with an initial ramp generator 32, an offset generator 31, and a signal adder 33. The ramp signal at the output of the ramp generator circuit 30 is provided to a first input of modulator circuit 34. Power converter 3 further comprises optional driver circuits 35 and a power stage 36. A first feedback loop comprises an error amplifier 37 which compares the output voltage at the output 39 of the power converter 3 with a reference voltage $V_{ref}$ and provides the result to the second input of modulator circuit 34. A second feedback loop 38 is coupled between the output 39 of the power converter 3 and the output of the initial ramp generator 32.

Figure 4:
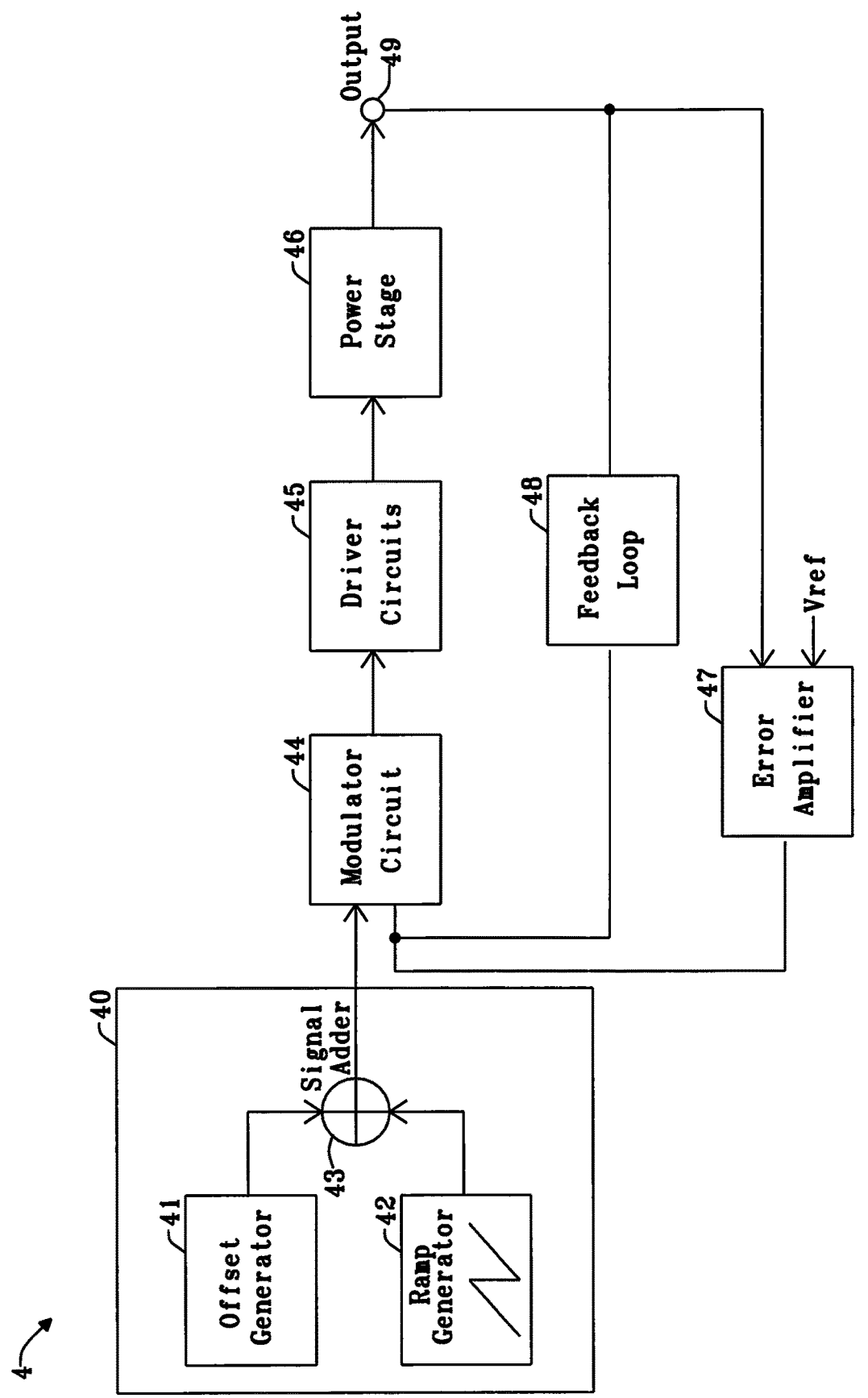
FIG. 4 shows a block diagram of a fourth exemplary power converter.

FIG. 4 shows a block diagram of a fourth exemplary power converter 4. Power converter 4 comprises a ramp generator circuit 40 with an initial ramp generator 42, an offset generator 41, and a signal adder 43. The ramp signal at the output of the ramp generator circuit 40 is provided to a first input of modulator circuit 44. Power converter 4 further comprises optional driver circuits 45 and a power stage 46. A first feedback loop comprises an error amplifier 47 which compares the output voltage at the output 49 of the power converter 4 with a reference voltage $V_{ref}$ and provides the result to the second input of modulator circuit 44. A second feedback loop 48 is coupled between the output 49 of the power converter 4 and the second input of modulator circuit 44.

Figure 5A:
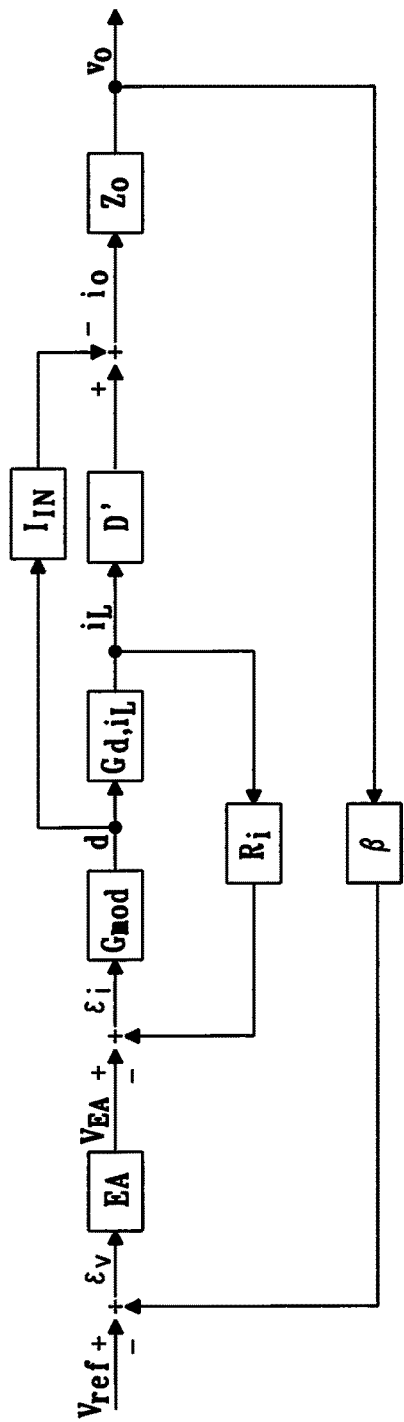
FIGS. 5A and 5B show a block diagram of a conventional current mode boost power converter and a corresponding transfer function.
Figure 5B:
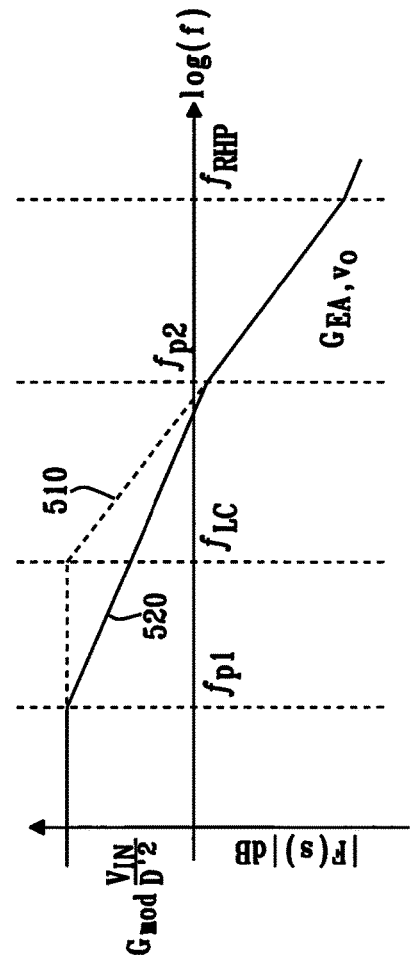

As already discussed in the foregoing, the proposed feedback mechanism has various benefits compared to prior art solutions. In the following, the proposed feedback mechanism is compared to power converters using conventional current control loops. FIGS. 5A and 5B show a block diagram of a conventional current mode boost power converter and a corresponding transfer function. The benefit of the internal current loop is that it splits the complex poles associated with the output LC filter (from $f_{LC}$ to $f_{p1}$ and $f_{p2}$) and simplifies the voltage loop design achieving a higher gain bandwidth product compared to the voltage mode control. In FIG. 5B, frequency $f_{RHP}$ denotes the right half plane zero frequency. The diagram compares the magnitudes of the transfer functions in case of voltage mode control (510) and current mode control (520). $G_{EA,v0}$ denotes the transfer function from node $v_{EA}$ to $v_O$. Moreover, EA denotes the error amplifier, $G_{mod}$ denotes gain of the modulator circuit (the transfer function from error signal $v_{ea}$ to duty cycle d), $G_{d,iL}$ denotes the transfer function from duty cycle d to coil current $i_L$, D' denotes the transfer function from coil current $i_L$ to output current $i_O$, $Z_O$ denotes the transfer function from output current $i_O$ to the output voltage $v_O$, $I_{IN}$ denotes the transfer function from duty cycle d to the current that is subtracted from the output current $i_O$ and represents a right half plane zero in the boost dcdc converter (Iin may not exist for a buck dcdc converter), β denotes the gain of the resistive divider at the input of the error amplifier, and $R_i$ denotes the gain associated with the current control loop. $Z_O$ denotes an impedance associated with the output capacitor and the load.

Figure 6:
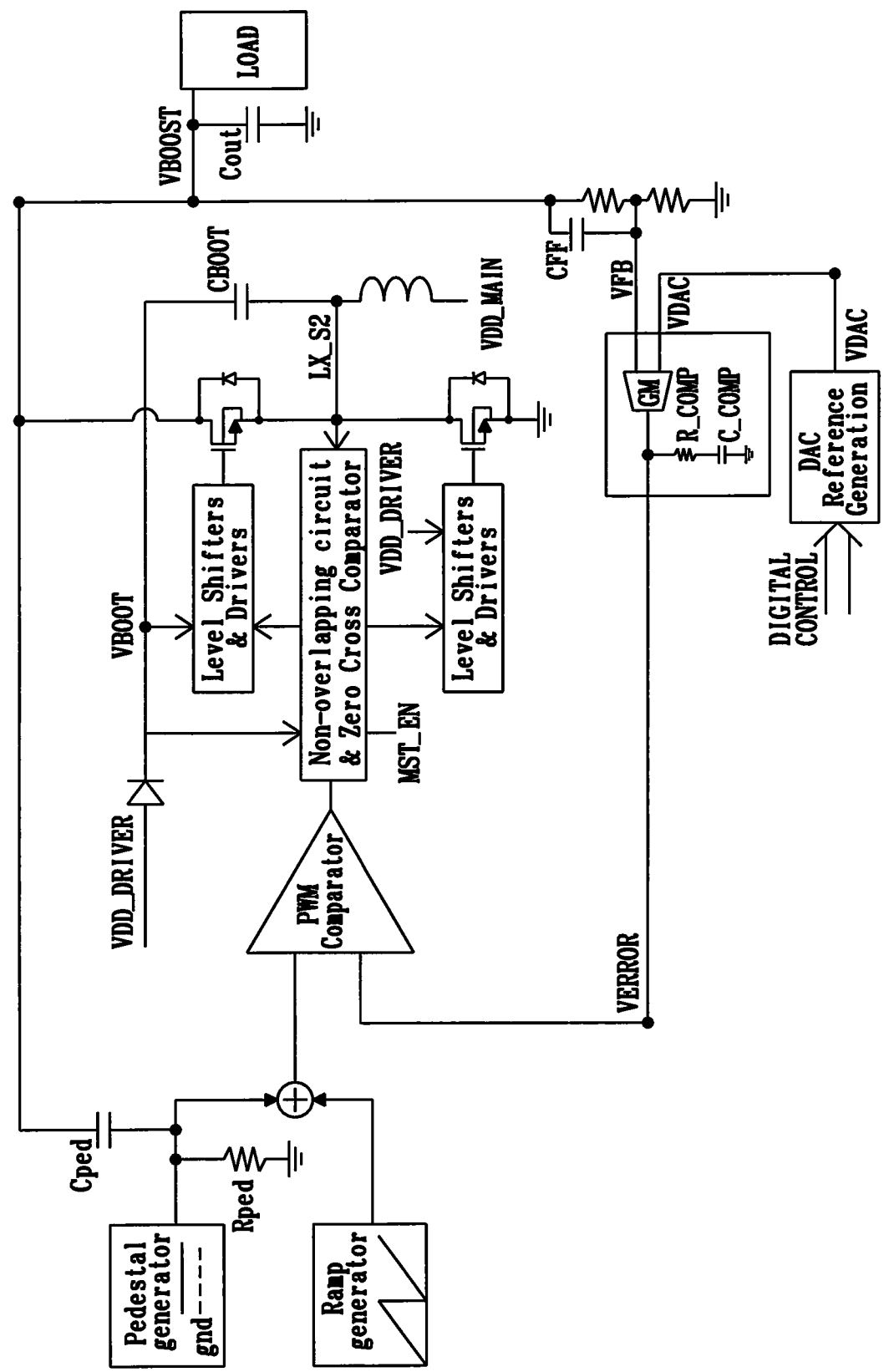
FIG. 6 shows a circuit diagram of an exemplary boost power converter with second feedback loop.

FIG. 6 shows an exemplary boost power converter with a second feedback loop (corresponding to the concept presented in FIG. 2). In FIG. 6, the first feedback loop generates error voltage VERROR. The second feedback loop comprises a high pass filter comprising capacitive element $C_{ped}$ and resistive element $R_{ped}$. The input voltage of the boost power converter is denoted as VDD_MAIN, and the output voltage of the boost power converter is denoted as VBOOST. In FIG. 6, the offset generator is denoted as pedestal generator.

The circuit in FIG. 6 provides the following advantages: Due to the simplicity of the second feedback loop, the required chip area may be substantially reduced. Further, since the DC/DC power converter becomes faster with the second feedback loop, there may be no need for additional vunder/vpanic comparators that typically help DC/DC converters to react to transient events. Moreover, there is no need to open the loop and correct internal signals manually in case of transient events. Furthermore, very smooth transitions between phases of multiphase DC/DC converter become possible. And, the DC/DC power converter is enabled to perform dynamic voltage control (DVC) with higher accuracy.

Figure 7A:
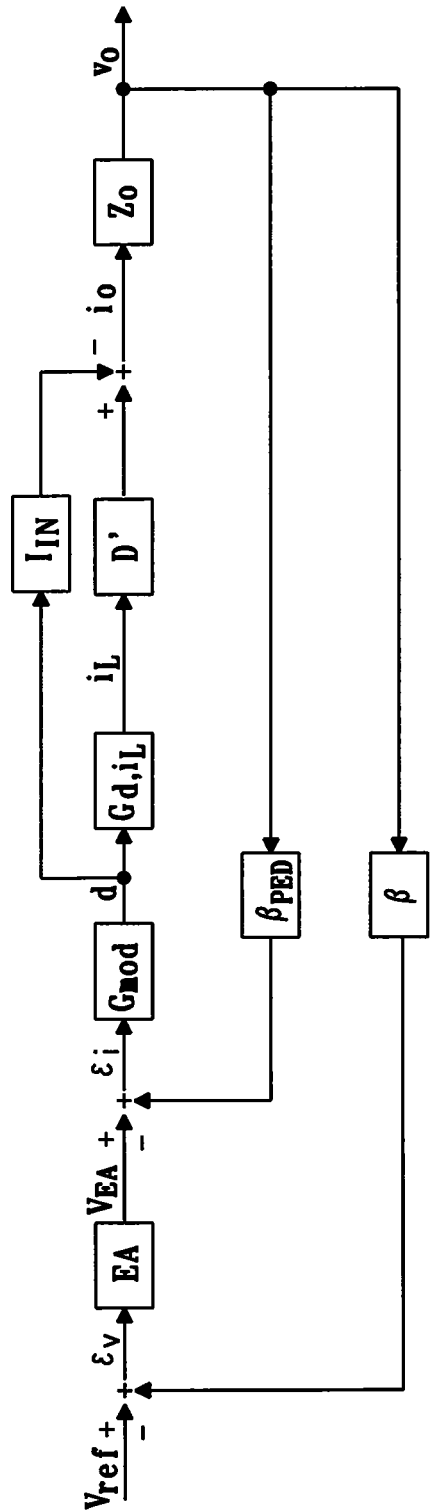
FIGS. 7A and 7B show a block diagram of an exemplary voltage mode boost power converter with the proposed Pedestal loop and a corresponding transfer function.
Figure 7B:
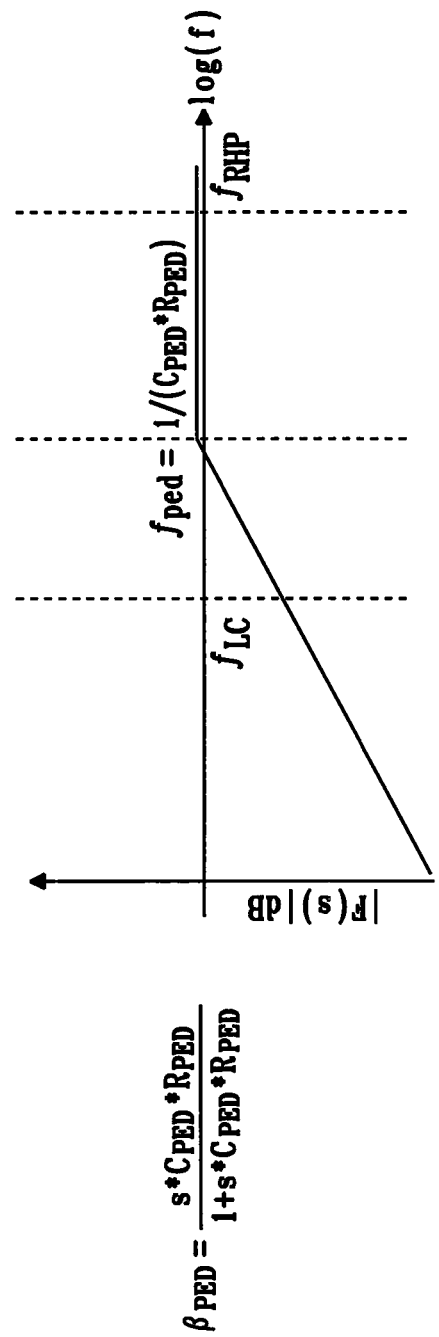

FIGS. 7A and 7B show a block diagram of an exemplary voltage mode boost power converter with the proposed second feedback loop and a corresponding transfer function. Again, $G_{EA,v0}$ is a transfer function from node $v_{EA}$ to $v_O$.

Figure 8:
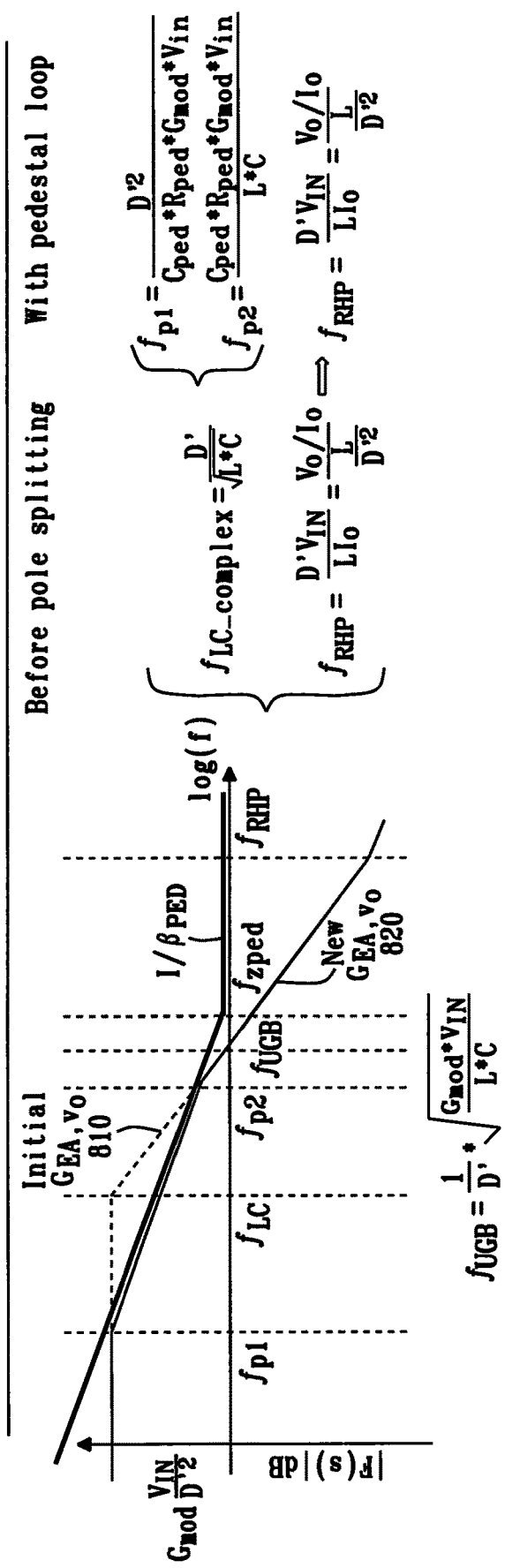
FIG. 8 shows a transfer function analysis ($f_{zped} > f_{UGB}$)
Figure 9:
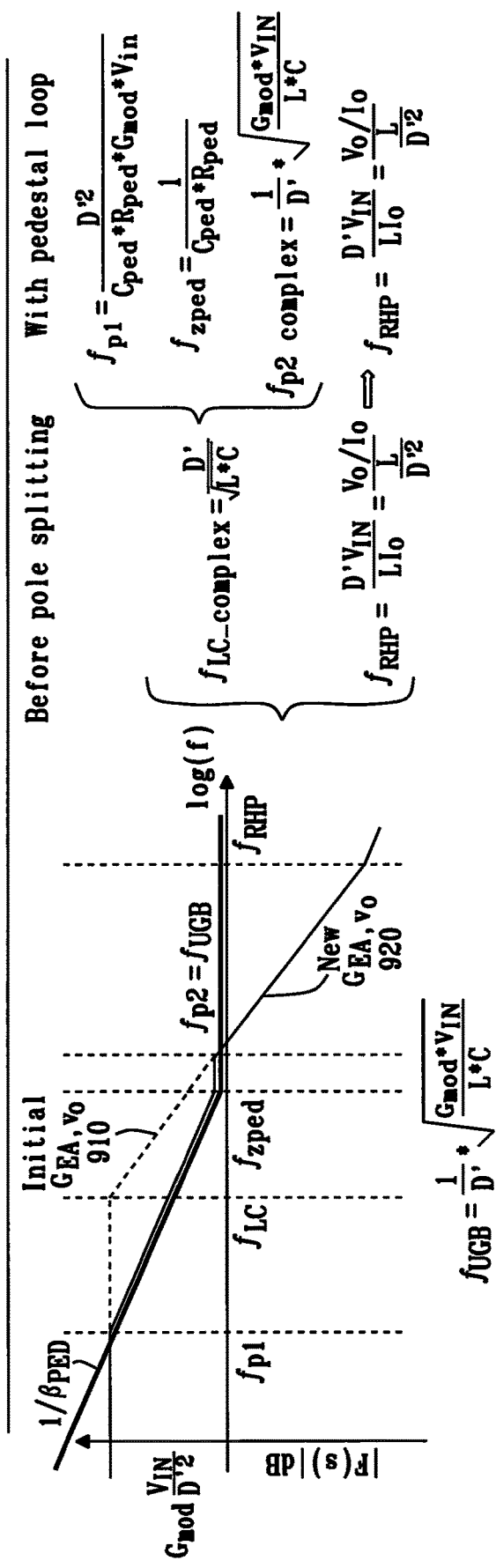
FIG. 9 shows a transfer function analysis ($f_{zped} < f_{UGB}$)

When combining two transfer functions (initial $G_{EA,v0}$ before pole splitting with $β_{PED}$), the resulting transfer function will split the complex LC poles. Depending on the position of $f_{zped}$ with respect to the unit gain bandwidth frequency $f_{UGB}$, there are two possible scenarios, which are illustrated in FIGS. 8 and 9, respectively. In FIG. 8, the initial complex poles, 810, $f_{LC}$ are split into 2 poles, 820, $f_{p1}$ and $f_{p2}$. In FIG. 9, the initial complex poles, 910, $f_{LC}$ are split into 3 poles, 920, $f_{p1}$ and $f_{p2\_complex}$ and a zero $f_{zped}$.

Figure 10:
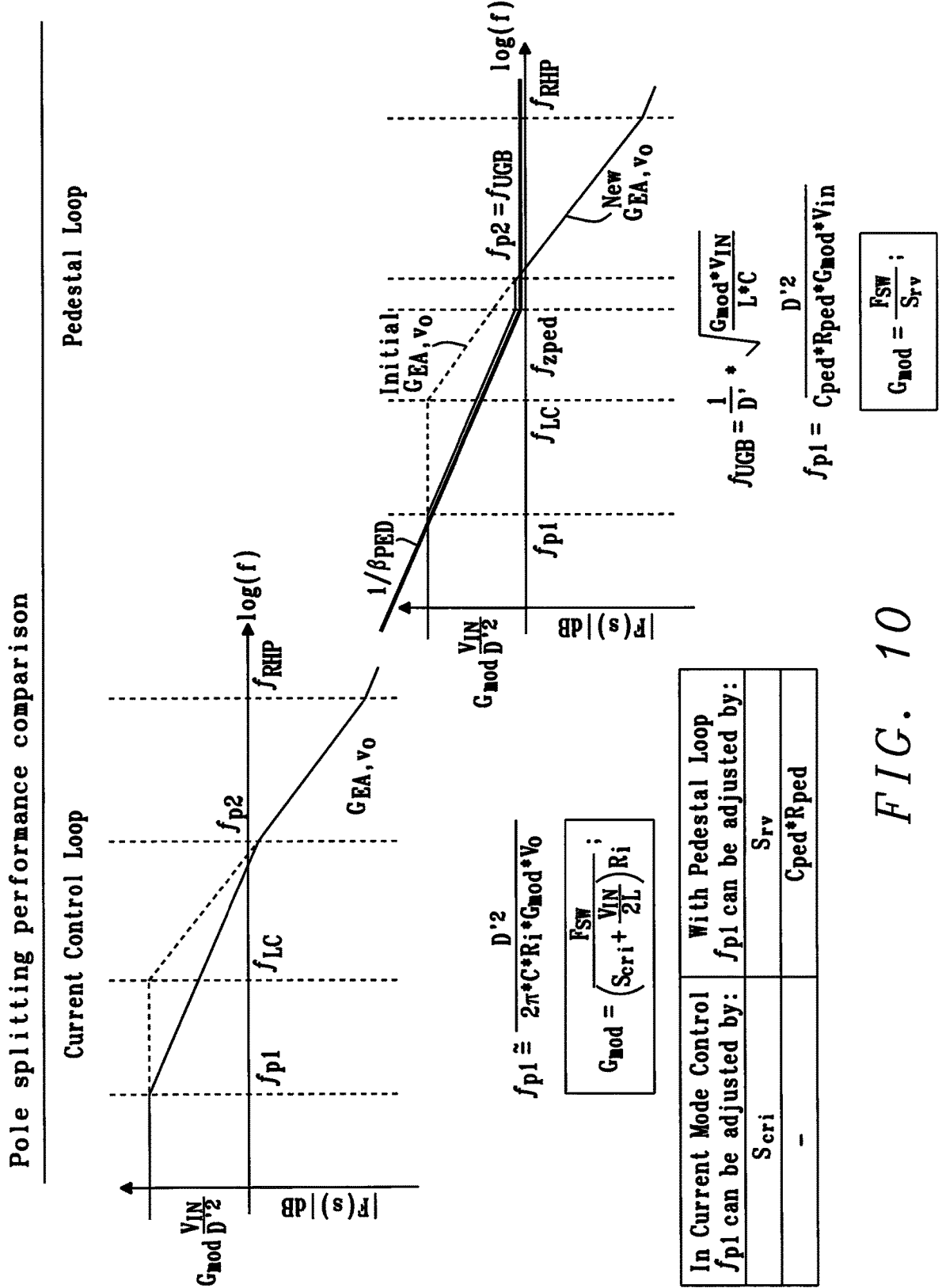
FIG. 10 shows pole splitting performance comparison.

For boost power converter applications, the current control loop has a limited pole splitting performance. It can be controlled only by the ramp slew rate $S_{sri}$. Instead, for power converters comprising the second feedback loop, there are more degrees of freedom. As illustrated in FIG. 10, the position of the poles (in particular of pole P1) can be adjusted by tuning the ramp slew rate $S_{rv}$ the value of capacitor $C_{PED}$, and/or the value of resistor $R_{PED}$.

Figure 11:
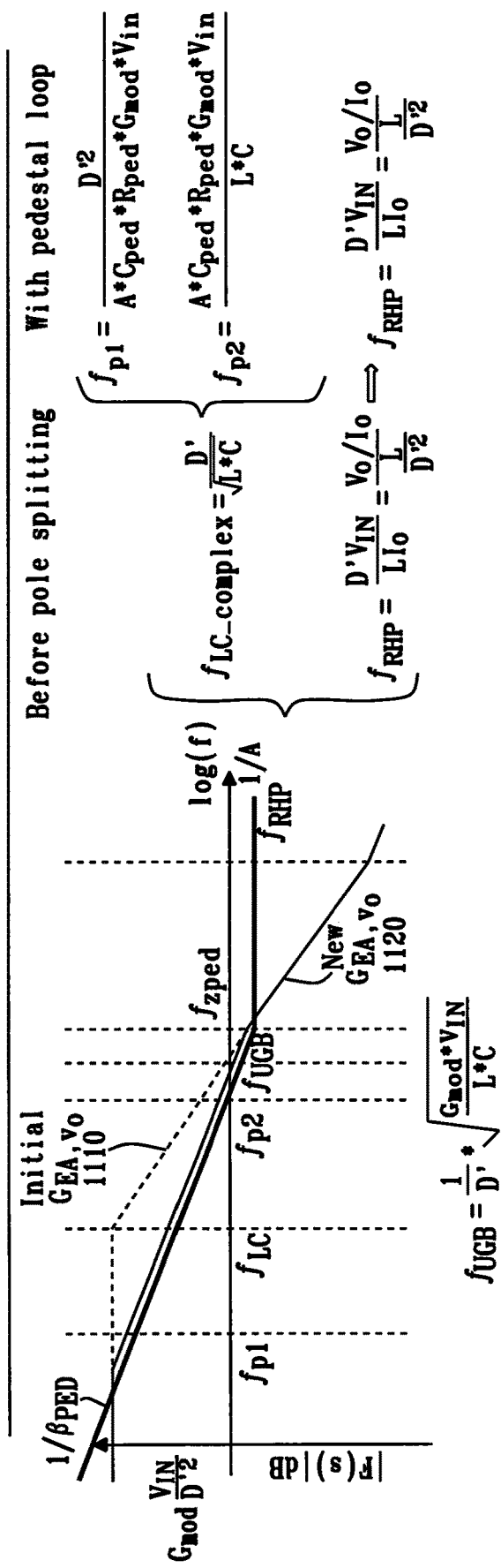
FIG. 11 shows a transfer function analysis for an active high pass filter.

If instead of a passive high pass filter an active high pass filter with a positive gain at high frequencies is used, then the transfer function will look as depicted in FIG. 11. It becomes evident that such an active high pass filter provides more degrees of freedom for designing the control loops. In FIG. 11, the initial complex poles, 1110, $f_{LC}$ are split into 2 poles, 1120, $f_{p1}$ and $f_{p2}$.

Figure 12:
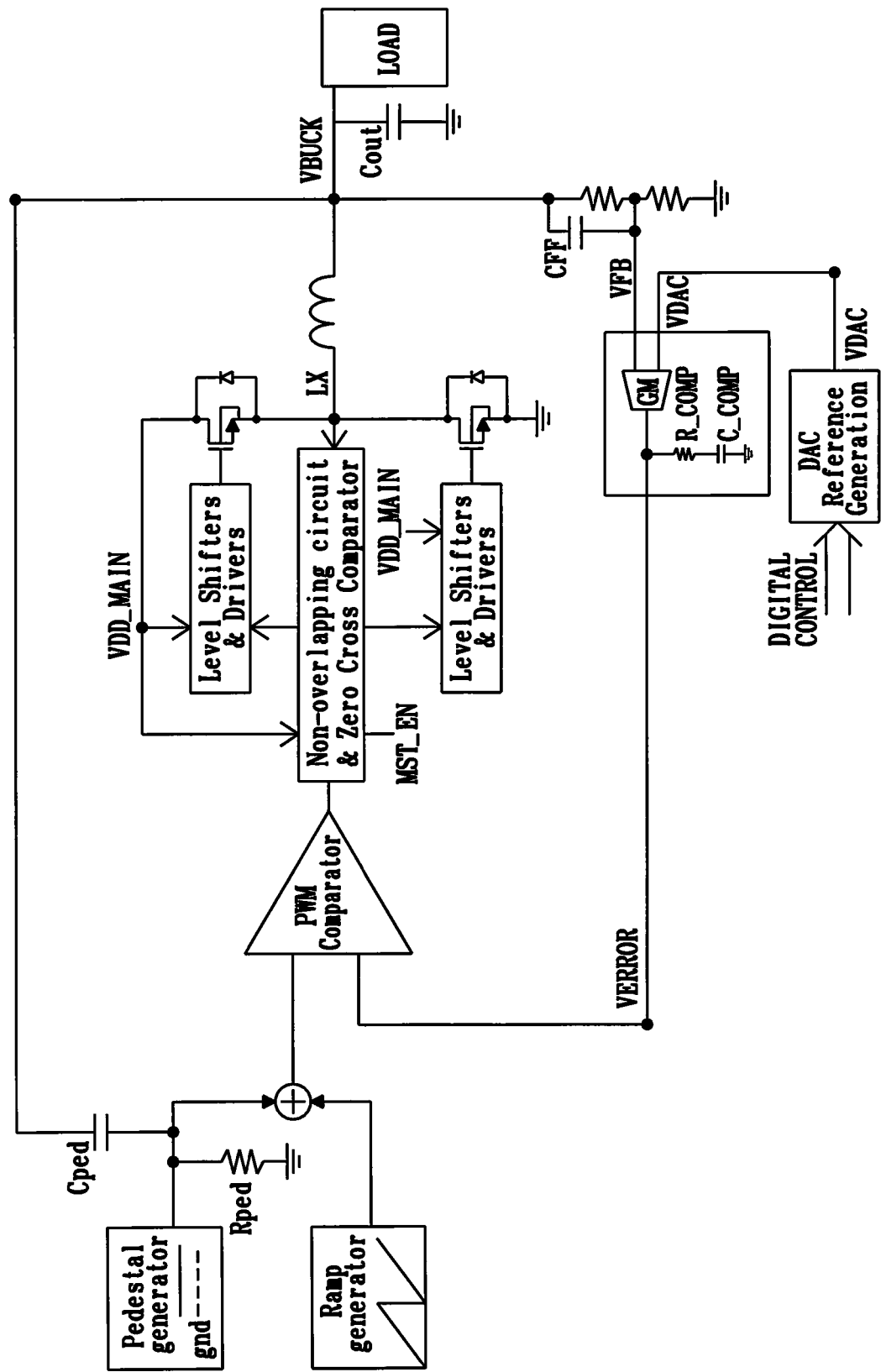
FIG. 12 shows a circuit diagram of an exemplary buck power converter with a second feedback loop.

Finally, FIG. 12 shows a circuit diagram of an exemplary buck power converter with a second feedback loop. In FIG. 12, the first feedback loop generates error voltage VERROR. The second feedback loop comprises a high pass filter comprising capacitive element $C_{ped}$ and resistive element $R_{ped}$. The input voltage of the buck power converter is denoted as VDD_MAIN, and the output voltage of the buck power converter is denoted as VBUCK. In FIG. 12, the offset generator is denoted as pedestal generator.

Figure 13:
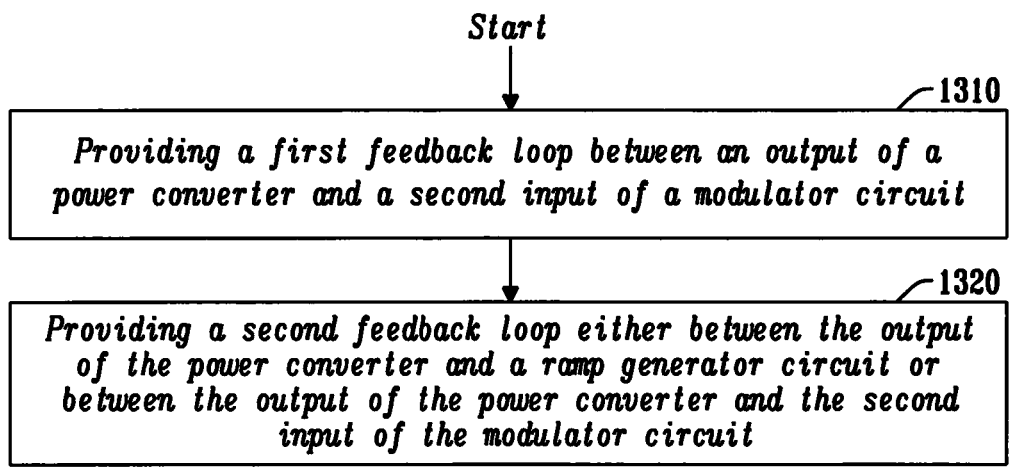
FIG. 13 shows a flowchart for a method of operating a pedestal loop in a DC/DC power converter.

FIG. 13 shows a flowchart for a method of operating a pedestal loop in a DC/DC power converter. The steps include 1310, providing a first feedback loop between an output of a power converter and a second input of a modulator circuit. The steps also include 1320, providing a second feedback loop either between the output of the power converter and a ramp generator circuit or between the output of the power converter and the second input of the modulator circuit.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter configured to generate an output voltage at an output of the power converter, the power converter comprising:
   a power stage coupled to the output of the power converter,
   a modulator circuit with a first input and a second input, wherein an output of the modulator circuit is coupled to the power stage,
   a ramp generator circuit configured to generate a ramp signal, wherein an output of the ramp generator circuit is coupled to the first input of the modulator circuit,
   a first feedback loop coupled between the output of the power converter and the second input of the modulator circuit, and
   a second feedback loop which is coupled between the output of the power converter and the first input of the modulator circuit,
   wherein the second feedback loop comprises a filter for blocking low frequencies, wherein the second feedback loop is coupled between the output of the power converter and the first input of the modulator circuit for providing additional high frequency feedback, and wherein providing additional high frequency feedback comprises propagating transient events at the output of the power converter to the modulator circuit for enabling correction of the output voltage.

2. The power converter of claim 1, wherein said second feedback loop comprises a high pass filter.

3. The power converter of claim 1, wherein the ramp generator circuit comprises
   an initial ramp generator configured to generate an initial ramp signal at an output of the initial ramp generator, an offset generator configured to generate an offset signal at an output of the offset generator, and a signal adder configured to generate the ramp signal at the output of the ramp generator circuit by adding the initial ramp signal and the offset signal.

4. The power converter of claim 3, wherein the second feedback loop is coupled between the output of the power converter and the output of the initial ramp generator, or the second feedback loop is coupled between the output of the power converter and the output of the offset generator.

5. The power converter of claim 2, wherein the high pass filter comprises a capacitive element which is coupled between the output of the power converter and the ramp generator circuit, or which is coupled between the output of the power converter and the second input of the modulator circuit.

6. The power converter of claim 5, wherein the high pass filter comprises a resistive element coupled between the capacitive element and a reference potential.

7. The power converter of claim 2, wherein the high pass filter comprises an active high pass filter with a positive gain in a passband.

8. The power converter of claim 1, wherein the first feedback loop comprises an error amplifier configured to compare the output voltage at the output of the power converter with a reference voltage.

9. The power converter of claim 1, further comprising a current feedback loop coupled between the power stage and the modulator circuit, wherein the current feedback loop comprises a current sensing circuit configured to sense a current within the power stage.

10. The power converter of claim 1, wherein the power stage comprises a high-side switching element coupled to a switching node of the power stage, and a low-side switching element coupled between the switching node and a reference potential.

11. A method of operating a power converter, wherein the power converter is configured to generate an output voltage at an output of the power converter, wherein the power converter comprises a power stage coupled to the output of the power converter, wherein the power converter comprises a modulator circuit with a first input and a second input, wherein an output of the modulator circuit is coupled to the power stage, wherein the power converter comprises a ramp generator circuit for generating a ramp signal, wherein an output of the ramp generator circuit is coupled to the first input of the modulator circuit, wherein the method comprises:

providing a first feedback loop between the output of the power converter and the second input of the modulator circuit, and providing a second feedback loop cither between the output of the power converter and the ramp generator circuit, wherein the second feedback loop comprises a filter for blocking low frequencies, wherein the second feedback loop is coupled between the output of the power converter and the first input of the modulator circuit for providing additional high frequency feedback, and wherein providing additional high frequency feedback comprises propagating transient events at the output of the power converter to the modulator circuit for enabling correction of the output voltage.

12. The method of claim 11, wherein said second feedback loop comprises a high pass filter.

13. The method of claim 11, wherein the ramp generator circuit comprises an initial ramp generator, an offset generator, and a signal adder, wherein the method comprises:

generating, by the initial ramp generator, an initial ramp signal at an output of the initial ramp generator, generating, by the offset generator, an offset signal at an output of the offset generator, and generating, by the signal adder, the ramp signal at the output of the ramp generator circuit by adding the initial ramp signal and the offset signal.

14. The method of claim 13, comprising coupling the second feedback loop between the output of the power converter and the output of the initial ramp generator, or coupling the second feedback loop between the output of the power converter and the output of the offset generator.

15. The method of claim 12, wherein the high pass filter comprises a capacitive element, and the method comprises coupling the capacitive element between the output of the power converter and the first input of the modulator circuit, or coupling the capacitive element between the output of the power converter and the second input of the modulator circuit.

16. The method of claim 15, wherein the high pass filter comprises a resistive element, and the method comprises coupling the resistive element between the capacitive element and a reference potential.

17. The method of claim 12, wherein the high pass filter comprises an active high pass filter with a positive gain in a passband.

18. The method of claim 11, wherein the first feedback loop comprises an error amplifier for comparing the output voltage at the output of the power converter with a reference voltage.

19. The method of claim 11, further comprising coupling a current feedback loop between the power stage and the modulator circuit, wherein the current feedback loop comprises a current sensing circuit for sensing a current within the power stage.

20. The method of claim 11, wherein the power stage comprises a high-side switching element coupled to a switching node of the power stage, and a low-side switching element coupled between the switching node and a reference potential.

* * * * *